United States Patent [19]

Lemelson

[11] 4,398,223
[45] Aug. 9, 1983

[54] SYSTEM FOR RECORDING VIDEO INFORMATION ON A RECORD CARD

[76] Inventor: Jerome H. Lemelson, 85 Rectro St., Metuchen, N.J. 08840

[21] Appl. No.: 257,376

[22] Filed: Apr. 24, 1981

Related U.S. Application Data

[63] Continuation of Ser. No. 951,763, Oct. 16, 1978, abandoned, which is a continuation-in-part of Ser. No. 654,939, Feb. 3, 1976, Pat. No. 4,121,249, which is a continuation-in-part of Ser. No. 474,392, May 30, 1974, abandoned, which is a continuation-in-part of Ser. No. 277,401, Aug. 2, 1972, Pat. No. 3,818,500, and Ser. No. 277,402, Aug. 2, 1972, abandoned.

[51] Int. Cl.³ .............................................. H04N 5/76
[52] U.S. Cl. ................................. 358/335; 358/347; 360/35.1; 369/32
[58] Field of Search ...................... 358/127–132; 360/2, 10, 35, 106; 365/120, 234, 235, 124, 126–128; 235/470, 471; 369/30–33, 41

[56] References Cited

U.S. PATENT DOCUMENTS

| | | | |
|---|---|---|---|
| 2,955,157 | 10/1960 | Young | 360/35 |
| 3,149,529 | 9/1964 | Gritchlow | 235/471 |
| 3,342,978 | 9/1967 | Cameron et al. | 235/471 |
| 3,731,060 | 5/1973 | Weinstein | 365/120 |
| 3,790,755 | 12/1970 | Silverman | 235/471 |
| 3,943,563 | 3/1976 | Lemelson | 235/471 |
| 4,121,249 | 10/1978 | Lemelson | 358/132 |

*Primary Examiner*—Raymond F. Cardillo, Jr.

[57] ABSTRACT

A record system and method for recording and reproducing information relative to record cards is provided wherein the information is in the form of optically scannable parallel tracks containing recordings therein which are defined by variations in the surface topography of the record tracks. A narrow beam of radiation such as that generated by a laser or an electron beam gun is modulated with information such as a video picture signal or digital information and is caused to scan the surface of a record card to generate either a variable topography represented by variations in the widths and/or depths of the narrow recording area of a record track caused by variations in the intensity of the beam of radiation as the beam is deflected to scan the recording track or the card is automatically moved to effect scanning by the beam. The beam may be operable to vaporize or otherwise variably erode and cause a groove or a series of cavities to be formed along the record track wherein the shape and/or depth of the cavities or separations therein represent electro-optically scannable information such as full-frame video picture signals, digital information and the like. In another form, the card may be coated with an erodable material which is vaporized or otherwise eroded to effect information recordings therein.

7 Claims, 6 Drawing Figures

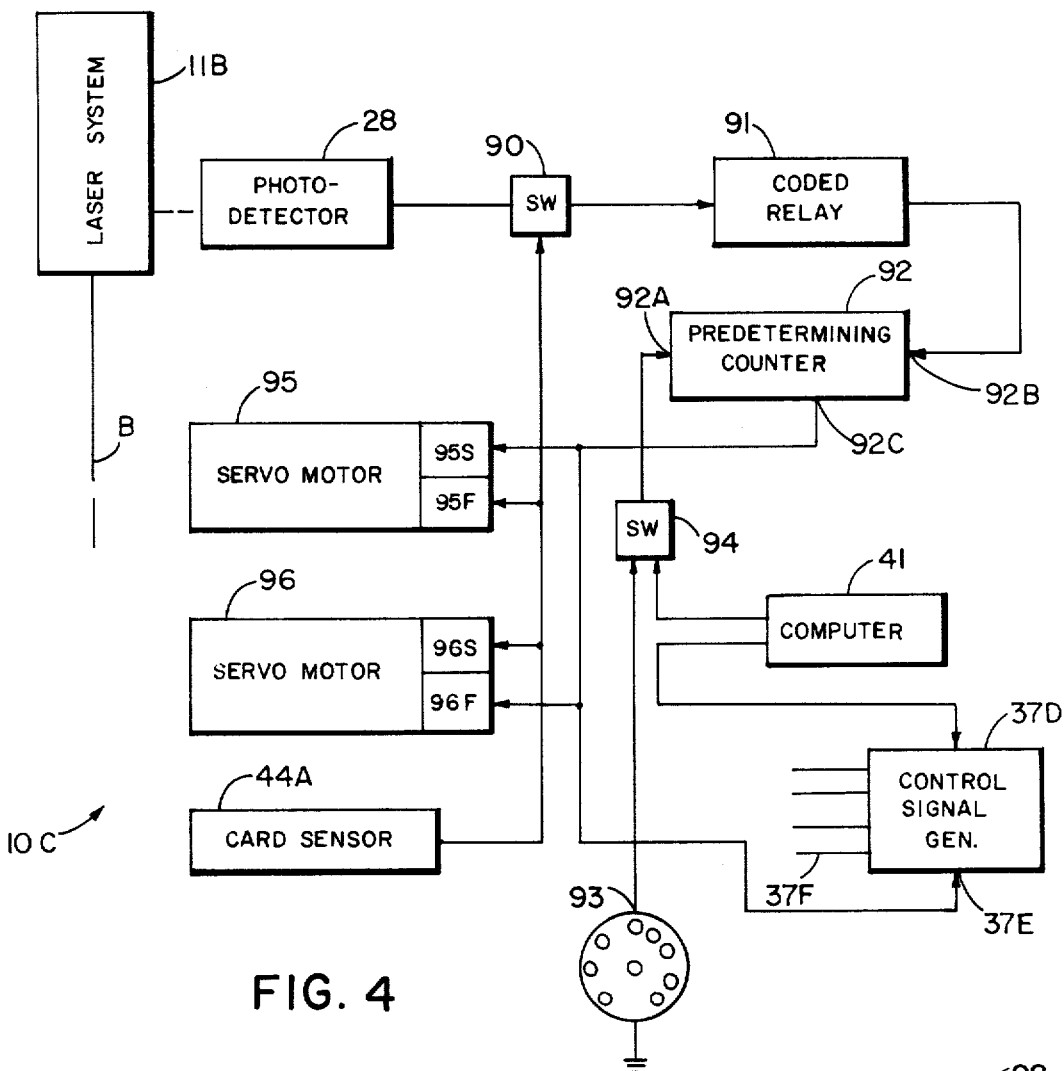
FIG. 4
FIG. 5
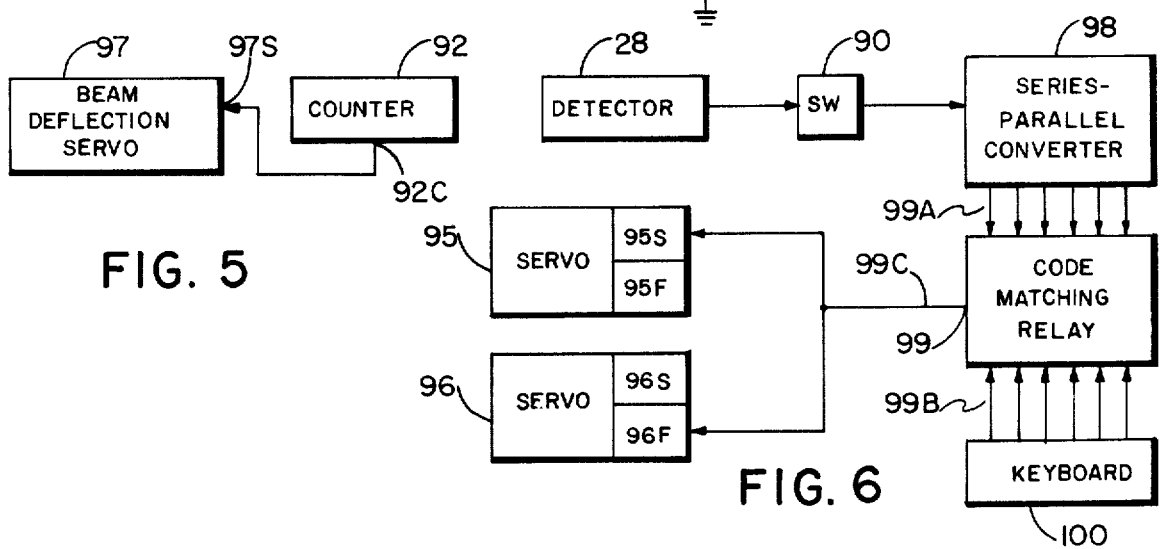
FIG. 6

SYSTEM FOR RECORDING VIDEO INFORMATION ON A RECORD CARD

RELATED APPLICATIONS

This is a continuation of Ser. No. 951,763 now abandoned filed Oct. 16, 1978 as a continuation-in-part of Ser. No. 654,939 filed Feb. 3, 1976, now U.S. Pat. No. 4,121,249, a continuation-in-part of Ser. No. 474,392 filed May 30, 1974, abandoned, which was a continuation-in-part of Ser. No. 277,401 filed Aug. 2, 1972, now U.S. Pat. No. 3,818,500 and Ser. No. 277,402 filed Aug. 2, 1972 now abandoned.

SUMMARY OF THE INVENTION

This invention relates to an apparatus and method for producing record cards and selectively reproducing information from said cards when it is needed. The invention is particularly concerned with the recording of indicia along parallel tracks of record cards or masters from which record cards may be produced and apparatus for selectively reproducing such information, preferably although not necessarily, a track at a time. In a particular and preferred form of the invention, the information recorded is in the form of full-frame video picture signals such as analog or digital signals produced on the output of a television camera scanning a document, photograph, drawing or other type of image field during a full-frame sweep of its read-beam or other means utilized to generate the image information.

Several forms of the instant invention are presented, all of which involve the use of a plurality of oblong, substantially flat or rectangular record cards which are edge coded and may be automatically retrieved from storage of a plurality of such cards which are stacked together in a storage bin. In a particular form of the invention, edge coding of cards is effected by burning or erosion of a portion of the edge or border of the card by means of an intense radiation beam.

A number of techniques are employed in the instant invention to generate and record as well as reproduce optically scannable information relative to record cards. In each, either the card is controllably moved per se during the recording and reproduction of selected information relative to parallel tracks of the card, the recording or reproducing radiation beam is deflection controlled per se to effect scanning or a combination of card and beam movement is effected to provide either or both recording and reproduction functions which are effected by intensity modulating the beam with signals generated, for example, by a television camera or a computer of the digital, analog or hybrid types.

The following modes of operation may be utilized during either the recording or reproduction functions relative to the record cards of the instant invention:

I. The card is selectively first positioned relative to a radiation beam generating means and is thereafter laterally moved to bring a selected track of the card into alignment with the radiation beam. The card is then moved longitudinally simultaneously as the radiation beam is generated to cause said beam to scan the selected track of the card in either the recording or reproduction function while the beam is either intensity modulated with an input signal to record information on the selected track or is modulated by information recorded on the track and the modulated light energy is detected by one or more photoelectric detectors which generate output signals indicative of the recorded information.

II. The card is first prepositioned relative to the radiation beam generating means, then laterally moved to bring a selected track of the card into alignment with the radiation beam generating means after which the beam generating means is activated and causes the beam thereof to move in a scanning sweep of the selected track of the card for recording thereon or reproducing therefrom. At the end of this function, the card is either shifted laterally to bring the next track thereof into alignment with the radiation beam generating means or to bring a selected track into alignment therewith or is rejected from the recording or reproduction device.

III. The card is first fed to a card recording and/or reproduction unit and is prepositioned relative to a beam generating means whereafter the beam generating means is either selectively electromechanically moved to cause the beam to scan a selected track of the card or the beam thereof is selectively deflection controlled to cause it to scan a selected track of a card in a recording or reproduction operation.

IV. The card is fed to a recording or reproduction unit and is either prepositioned and held within said unit while scanning is effected by means of a selected radiation beam of a bank of said beams extending across the card or is moved continuously past said bank of beams while one or more beams thereof operate to either record on or reproduce from selected track areas of the card.

V. The card is first fed to a rotary frame, preferably in the form of a drum and is made to conform thereto while the drum rotates past one or more light beam generating means to effect the scanning of a selected track of the card as it is rotated for recording thereon and/or reproducing therefrom.

Several recording techniques are provided for the instant invention which include the erosion of a thin metallic or plastic film disposed on a record card or master card by the intense radiation generated by an electron or laser light beam, the sensitizing of a photographic emulsion or similar photosensitive material disposed on or within the substrate of a record card by means of an intensity modulated electron or laser beam or a pulsed beam modulated with input energy generated, for example, by the signal output of a television camera or a computer. In the former method, the eroded areas of the card extend along substantially parallel record tracks and are used to variably modulate a reading beam of light reflected off or passed through the card to one or more photoelectric detectors. The recordings so made may be utilized per se or may be employed to produce a master die, mold or embossing roll from which any number of similar impressions may be made on oblong record cards.

Accordingly, it is a primary object of this invention to provide a new and improved apparatus and method for producing record cards containing both analog and video information and digital information in the form of optically scannable but normally unintelligble indicia which may be photo-optically detected and utilized to generate electrical signals which may be processed such as by means of a display cathode ray tube.

Another object is to provide a record system for storing a substantially large amount of information in a form which may be easily reproduced and on record cards which may be rapidly retrieved from storage, thereby substantially reducing the access time for the stored information.

Another object is to provide a card storage and retrieval system having a high density of recordings per card wherein the information may be rapidly reproduced and displayed, yet is easily recorded at low cost.

Another object is to provide a document storage and retrieval systems employing cards, each containing a multitude of image recordings which may be selectively reproduced and employed to generate still images on cathode ray display means.

Another object is to provide an apparatus and method for recording a substantially large number of document recordings on a record card, each of which occupies a record track extending substantially the length of the card and is selectively reproducible therefrom to generate picture signals which are utilized to generate respective images on an electronic display means such as a cathode ray tube.

Another object is to provide new and improved structures in record cards containing document recordings.

Another object is to provide a new and improved apparatus and method for coding document record cards.

Another object is to provide a new and improved apparatus and method for edge coding record cards by means of intense radiation which is operable to burn portions of an edge of a card.

Another object is to provide an apparatus and method for edge coding record cards by means of an intense radiation beam which is operable to selectively sensitize photosensitive material disposed along the edge of a card.

With the above and such other objects in view as may hereafter more fully appear, the invention consists of the constructions, combinations of components and arrangements thereof to perform the recording and reproduction functions described, but it is to be understood that changes, variations and modifications may be resorted to which fall within the scope of the invention as claimed.

In the drawings:

FIG. 3 is a schematic diagram of a second form of the invention wherein read and/or write beam scanning is effected while the card is in motion.

Figure 1:
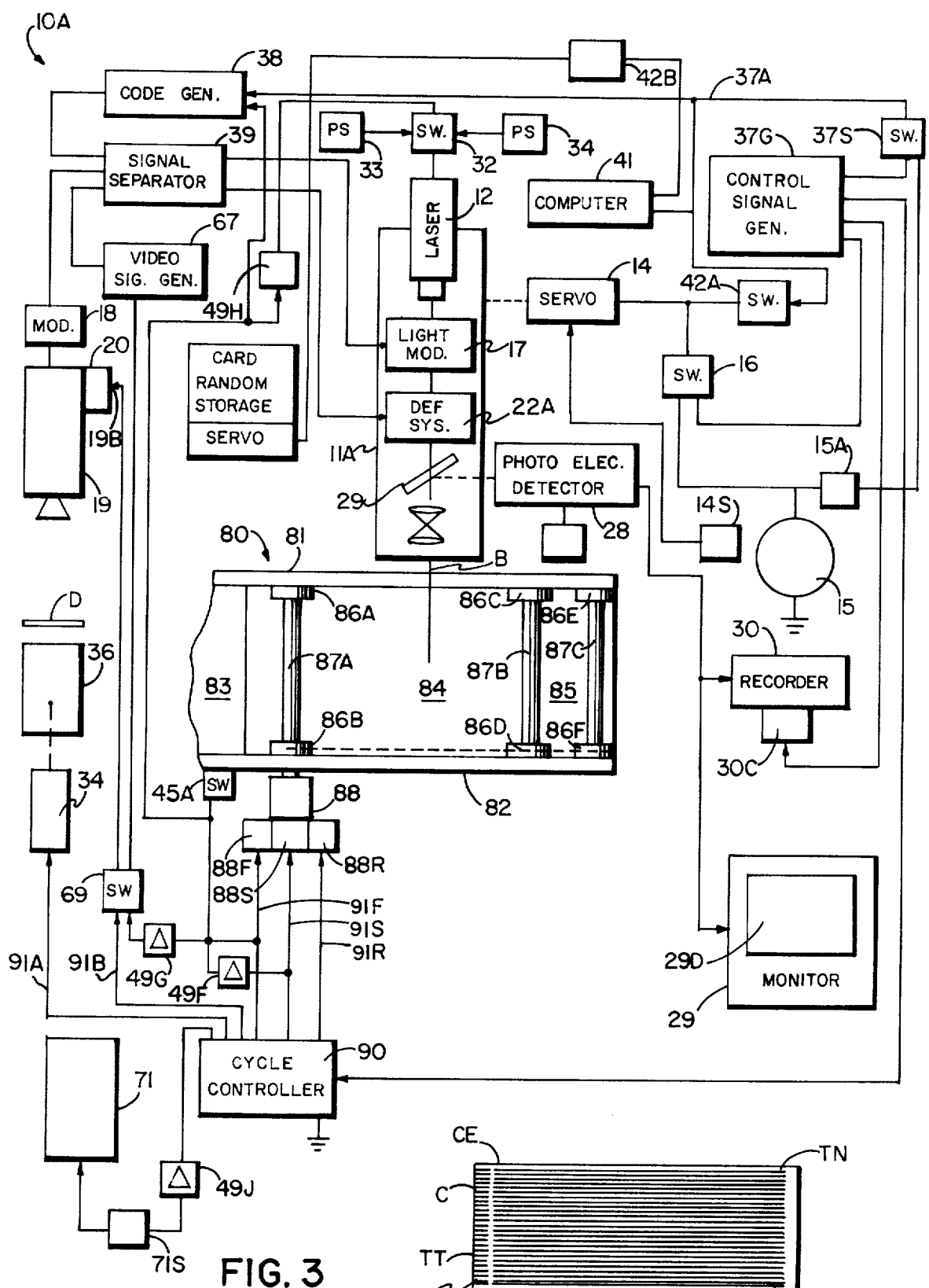
FIG. 1 is a plan view of a record card showing recording arrangements on the face thereof, which card may comprise the record medium of the instant invention.

A number of modes of operation of card recording and reproduction apparatus defining the instant invention are possible and are noted as follows:

I. In a first mode of operation, the record card is driven or placed at a recording location at which it is predeterminately located with respect to a radiation beam generating device, such as a laser or electron gun, which is operable in response to its receipt of control signals to effect the following mode of operation:

(a) The track seeking deflection control means for the recording beam is first controlled in its operation either by open-loop control thereof in response to a particular deflection control signal or group of such signals or by means of feedback signals generated as said deflection control means operates to locate the write-beam in alignment with a selected track of the card after which the beam is further deflection controlled to scan the selected track of the card while an information signal or group of signals is generated and fed to either or both further deflection control the beam in a recording operation along the selected track and/or intensity modulate the beam as it scans a selected track to create variations in the location and/or intensity of the radiation generated at the surface of the selected track for effecting variable erosion or photographic recordings therein which are representative of the information to be recorded. This information may comprise, as described, a full-frame video picture signal in analog or digital form of an image field containing a document, a plurality of such full-frame video picture signals, each of a different image field or digital information. The information may be in the form of one or more wavy lines of similar or variable thickness, a plurality of lines or bands of different color which vary in thickness or lateral deflection along the length of the track, a plurality of spot recordings, pits or bar recordings, the dimensions and separations of which represent the recorded information or a variably colored or grey density varying line, the degree and location of which variations represent the recorded information.

When the beam has been deflection controlled to scan the entire selected track or a selected portion thereof, it is gated off until the next recording operation.

II. In the second mode of operation, the recording beam is adapted to scan along a particular axis while the card is longitudinally and laterally positioned to locate the selected track in alignment with the scanning axis and to move the card to cause the selected track to be swept through the scanning axis during the recording operation as the beam is intensity modulated and/or varied in focus or width along the selected track. Information signals fed to the beam control means vary its intensity and/or width during the recording operation to variably erode or photographically expose the strip-like area of the selected track as the card is driven longitudinally through the recording device.

III. In a third mode of operation, the card is moved laterally to bring the beam into alignment with the selected track of the card and thereafter the beam is scanned along the selected track while the card remains stationary and the beam is varied in intensity and/or focus or width to record the desired information.

IV. In a fourth mode of operation, the card is only driven longitudinally while the beam is deflection controlled in a particular direction to bring it into alignment with a selected track of the card after which the beam is further deflection controlled within the confines of the selected track and/or is intensity or focus modulated to record the desired information as the card is driven longitudinally through the recording section of the apparatus.

Component and Subsystem Descriptions

The following general notations are employed in the drawings in block form and are briefly described as follows:

11-A housing containing a recording and reproduction radiation beam generating means such as a laser, electron beam gun, molecular beam generator, etc. Preferably also includes, where applicable, beam deflection and modulation means.

37-A control signal generator such as an electromechanical or electronic multi-circuit timer operable, when activated by a start signal generated on its start-input to generate a plurality of signals in sequence on a plurality of outputs thereof for controlling motors, solenoids and switches as described.

29-A video monitor such as a stoage tube or direct viewing cathode ray tube driven by a storage tube capable of generating still images of the information recorded on and reproduced from a selected card track.

15-A manually operated pulse train signal generator such as a rotary dial switch or keyboard for directly or indirectly controlling track selection for recording on or reproducing from.

49-Delay relays or delay lines for delaying signals used in control.

38-Array of logical switching elements for generating progressive codes to be recorded on sequential tracks of a record card or codes defined by keyboard operation thereof.

39-Signal separator capable of separating a composite video signal into its picture signal and sync signal components.

19-Television camera or flying spot scanner having deflection control circuits and devices forming part of a controller 20 which, each time it is energized by a trigger pulse generated by a limit switch, computer or signal generator, generates a full frame composite video picture signal on its output 19A which is processed and used to modulate and deflection control the laser or electron beam used in recording the video information on the selected record track of the card. See U.S. Pat. No. 3,051,777 for details of a typical full frame scanning video camera.

27-Servo motor such as constant speed or stepping motor for pivotally deflecting an optical component through mechanism 27M to deflect laser beam to scan selected track of card.

16,69,-Multiple pole, multiple throw switches for connecting single input to one or more selected outputs. 16-flip-flop switch for connecting one of two inputs to single output.

41-Digital Computer operable to generate control signals on an output or plurality of outputs to effect the selective recording and/or reproduction of video information on selected tracks of record cards forming part of the document storage and retrieval system.

In order to simplify the diagrams, it is assumed that, where not shown, the correct power supplies are provided on the proper sides of all controls, switches, motors, solenoids, signal generators, relays, signal separators, monitors and other devices.

In FIG. 1 is shown a record card structure and recording arrangement thereon utilized in the systems defining this invention. The card C may be provided in one or more structures and defines a plurality of record tracks denoted TA-TN which extend parallel to each other and preferably, although not necessarily, parallel to the longitudinal axis of the card occupying most of a major surface of the card. The card may be fabricated of paperboard, metal or plastic and is utilized per se as a record member wherein a stratum of a major surface thereof is eroded, embossed or otherwise provided with irregularities along the record track portions of the card which irregularities serve to diffract and/or variably reflect light to one or more photoelectric detectors after the light is either passed through the card or is reflected off the selected record track. The card C may also be made of metal, plastic or paperboard which is coated on at least one major surface thereof with a material which is embossed, eroded or otherwise formed with irregularities therein including the recorded information. Such coating material may comprise a photographic emulsion having developed therein information along the record track portions of the coating, a thin plastic film which is eroded or embossed with the desired information, a coating of metal which has been vapor deposited on the card or on a coating disposed thereon or other suitable material containing the recorded information developed therein, embossed, eroded, deposited or otherwise disposed therein or thereon.

The card C preferably varies from about 1-8 inches in width to 1-10 inches long; if conventional card getting and storage means are to be utilized for storing and retrieving the card, it is preferably configured as a rectangular, self-supporting card of the so called IBM type. Edge coding CE in the form of printed or magnetic bar codes, notched codes or other form of scannable codes extend along one of the longitudinal edges of the card while fine printed lines TT extend a short distance from the leading edge CL of the card for controlling lateral positioning of the card or the reading or writing radiation beam to effect track selection. Each of the track locating lines TT are precisely aligned with a respective of the record tracks of the card and may be photo-optically scanned to generate pulses to control beam or card movement.

Figure 2:
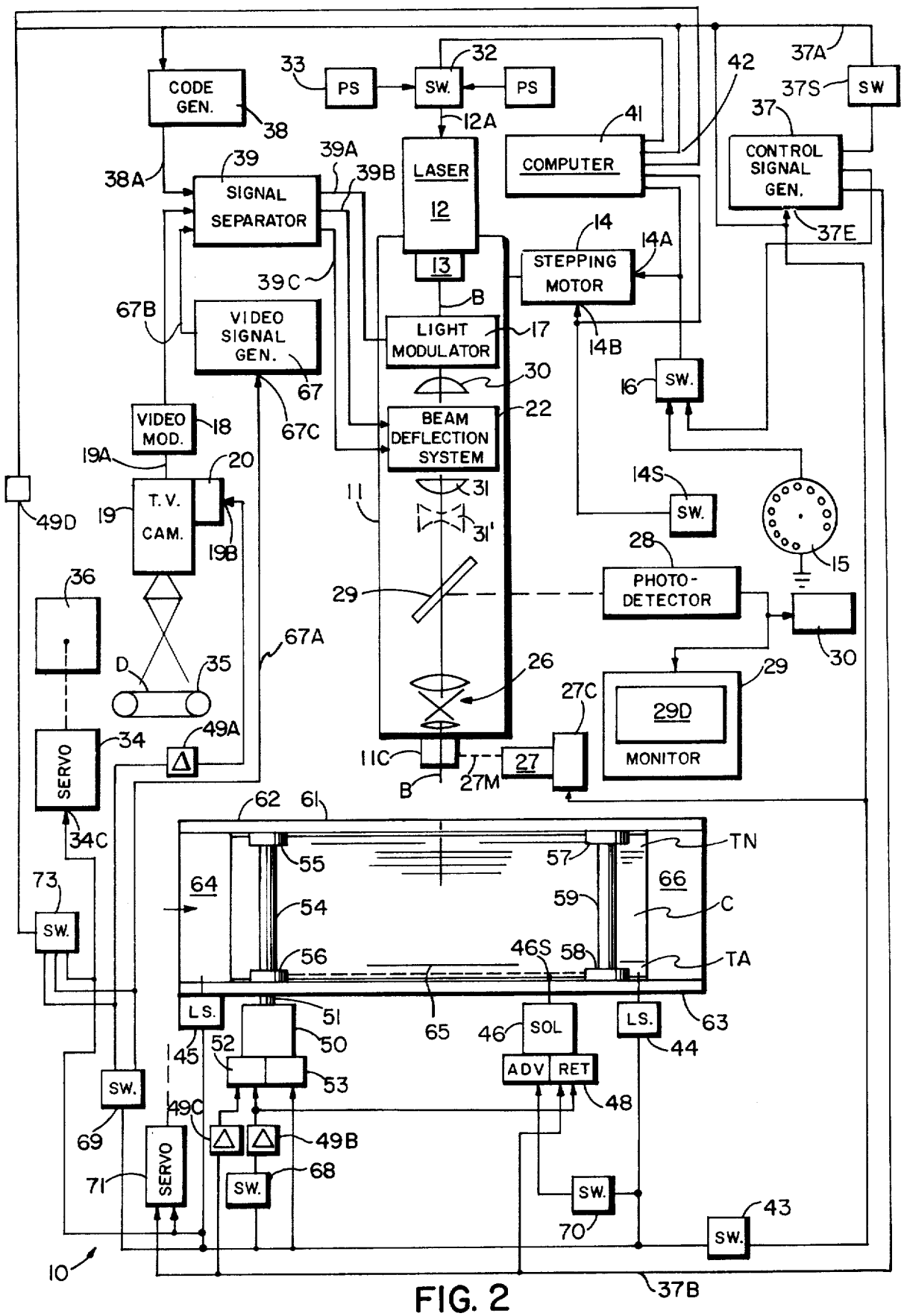
FIG. 2 is a schematic diagram of a first form of the invention showing a card scanning arrangement wherein the card is held stationery while a scanning beam scans a selected track thereof.

In FIG. 2 is shown a system 10 which may be employed to both record selected information along selected tracks of cards of the type shown in FIG. 1 and to selectively reproduce information recorded along said tracks. Cards are selectively fed to and predeterminately positioned on a central platform 65 forming part of a card feeding and prepositioning device 61 which is predeterminately located with respect to a housing 11 containing a source of intense radiation such as a laser 12 and suitable electro-optical beam modulation and deflection control means. The laser 12 generates its intense beam on an output 13 by receiving power from either a first power supply 33 of sufficient intensity to generate recording radiation at the output of the laser or a second power supply PS of intensity to generate reading radiation of the laser output. A bi-stable switch 32 connects either power supply to the input 12A to laser 12. Notation 12 may also refer to a housing containing two lasers, one of which is adapted to be energized to generate recording radiation and the other to generate reading radiation when respectively connected to the power supplies 33 and PS through the manual switching means 32 and each is operable to generate its beam on a single output 13.

The radiation beam generated on the output 13 is first passed through a light modulator 17 which may be of the type defined in U.S. Pat. No. 3,534,166, which receives intensity modulation video signals from a television camera 19 as separated from the deflection control signals of the camera by a video signal separator 39 of conventional design. The beam passes through lenses 30,31 disposed on the inlet and outlet sides of a deflection system 22 and a telescope 26 for imaging the beam upon the plane of the card C which is disposed at a suitable distance from the end of housing 11 on the central platform portion 65 of the device 61. The deflection system 22 and other optical components illustrated within housing 11 may be made in accordance with the disclosures found in U.S. Pat. No. 3,534,166 wherein said components are set forth by means of the same numerical notations provided in said patent and in FIG. 2.

To further define the system of FIG. 2, descriptions of typical operating cycles involving the system in both the recording and playback modes are provided hereafter:

Beam Recording Cycle Recording of selected information on selected tracks of a record card may involve semi-automatic or fully automated card handling and information generating operations. Full-frame video picture signals to be recorded on a selected track of the card C may be generated on the output 19A of television camera 19 when the trigger input 19B of the camera is energized by a control pulse which is generated by a limit switch 44 sensing the leading edge of a card C fed to the platform 65 of device 61. The camera 19 contains a controller 20 which receives the trigger pulse from input 19B and operates thereafter to cause the read-beam of the camera to execute a full-frame reading sweep of its optical image field which is modulated with light received from a document D which may be a printed page, drawing, photograph or otherwise formed field of visual information. Documents D may be fed from a stack 36 thereof onto a conveyor 35 when a servo motor 34 is operated to intermittently feed said documents to the conveyor 35 and dispose same in the scanning field of the camera 19. Full-frame video picture signals may also be generated by a video signal generator 67 such as a video tape recorder which is automatically operated in response to control signals generated by the limit switch 44, a computer, etc.

Record cards are individually fed to a receiving platform 64 of the card driving and positioning device 61 by hand or by means of an automatic card feeding device of conventional design which is driven by a servo motor 71. The leading edge of each card fed to platform 64 is sensed by a limit switch 45 which generates a pulse on its output which pulse is transmitted to the forward drive control 52 of a constant speed gear motor 50 having its output shaft 51 connected to a plurality of drive rollers, four of which are illustrated and denoted 55, 56, 57 and 58. Rollers 55 and 56 are supported by a first shaft 54 driven by motor 50 and cooperate with respective rollers (not shown) to pinch-engage the leading end of the card and to drive same forwardly in cooperation with a plurality of pairs of other rollers such as rollers 57 and 58 supported on shaft 59 which is chain driven with the rotation of shaft 54.

The device 61 is composed of a housing having side walls 62 and 63 which are separated from each other substantially the width of a card so that a card properly aligned on and fed along receiving platform 64 is laterally positioned with respect to housing 11 so that the beam of radiation emitted from said housing may selectively be brought to intersect any selected track of the card disposed on the central platform 65.

When the card C has reached the forward end of platform 65, it actuates a limit switch 44 which generates a pulse on its output which is transmitted to the stop control 53 of motor 50 which stops the forward drive of the card and to an advance input 47 of a solenoid 46, the output shaft 46S of which is advanced against the upper surface of the card clampingly engaging the card to the platform 65 so as to hold it in place during a recording or reading operation.

If it is desired to record on just one selected track of a card disposed on platform 65, suitable electrical logic components are provided to immediately move the card off the platform 65 to an exit platform or receiving bin 66. If it is desired to retain the card in position on platform 65 while information is recorded on additional tracks of the card such as a predetermined number of tracks which exist to one side of the first track on which recording is effected, then the card is retained in position until the complete recording operation is finished after which the card is automatically rejected from the device 61.

Assuming that it is desired to record a video signal such as a composite full-frame video picture signal including all of the intensity modulation, deflection control, blanking and equalizing signals associated with a frame and necessary to generate a still image on the screen of a video monitor such as a television storage tube or a conventional image cathode ray tube which is energized by signals generated by a video storage tube, then the card to be recorded on is fed to the receiving platform 64 between the side walls 62 and 63 of the device 61 in a manner to cause its leading edge to be detected by and actuate limit switch 45. Limit switch 45 generates an output pulse which is fed to the forward drive control 52 of motor 50 causing the motor to be started and operate the drive wheels 55-58 driving the card along platform portion 65 until the leading edge thereof is detected by limit switch 44 which generates a control signal which is transmitted directly to the stop control 53 of motor 50 effecting stoppage of the driving of the card and to the control 47 of solenoid 46 advancing the actuator 46S against the card and holding the card in position on platform 65. The output of limit switch 44 is also transmitted through a manually operated switch 69 to the trigger input 19B of the single frame controller 20 of camera 19 causing the beam of the camera to scan the image of the document D disposed by hand or conveyor 35 in the scanning field of the camera and a full-frame video picture signal representative of the document information is generated on output 19A and passed through a video modulator 18 to the signal separator 39 which separates the intensity modulation portion of the composite video signal and transmits same on an output 39A to the light modulator 17 and deflection control signal components on outputs 39B and 39C which are connected to the deflection control system 22 causing the beam of the laser to scan the selected track in a recording mode. Prior to the recording or reproduction scanning operation, the laser beam is aligned with the selected track of the card by predeterminately pivoting either a suitable optical component, such as a mirror located in the output of the laser or the laser housing 11 in such a manner as to cause the beam B generated on the output of housing 11 to intersect the selected track preferably at one end thereof defining the point at which recording is to be initiated. Accordingly, a servo motor such as a stepping motor 14 is predeterminately operated prior to the generation of the video signal, which may be prior to feeding the selected card to the device 61, and is connected to either predeterminately pivotally position the entire housing 11 to cause the scanning axis of the beam emitted therefrom to intersect the selected lateral track of the card or to deflect an optical component through which the beam passes or reflects off to cause said beam to intersect the selected track of the card.

Longitudinal scanning of the beam along the selected track is effected in FIG. 2 by means of an electromechanical drive system including a suitable servo motor 27 which is operable to drive mirror 11C disposed at the output of the housing 11 to receive the beam which is deflected by the motor 27 in a longitudinal direction along the selected track. When the beam is terminated at the end of the video signal after it has scanned the selected track, the motor 27 and mechanism 27M driven thereby, automatically operates to return the reflecting device 11c at the output of housing 11 to a home location such that the next beam generated and modulated with information from the next video picture signal which is generated, will intersect the next selected track of the card or the next card prepositioned on platform 65 at the start location of the track and the described scanning cycle may be repeated.

Accordingly, the output of limit switch 44 is connected through a delay element 49A to the control 20 for camera 19 to allow motor 27 which deflects mirror 11C to accelerate to a constant speed. The delay element 49A is of such duration that the video picture signal generated at the output of television camera 19 will modulate the beam as it is driven longitudinally along the selected track of the card and the motor 27 is operable at constant speed to cause the beam to scan the desired length of the selected track to properly effect a full-frame video picture signal recording therealong.

Also illustrated in FIG. 2 is a code signal generator 38 which is operable to generate a different binary digital code, preferably in an arithmetic progression, on its output 38A each time an input 37A thereto is pulsed. The input 37A is connected to be pulsed either in response to a signal generated by limit switch 44 when it detects the leading edge of the card or in response to a signal generated by a pulse generator 37 which operates in response to the signal generated by switch 44 and sequentially generates control signals for the components of system 10 in such a manner as to effect the recordings of a plurality of different signals on a plurality of tracks of a card prepositioned on platform 65.

In the operational mode of system 10 involving the recording of a selected information signal on a selected track of a card prepositioned on device 61, an operator may generate a plurality of pulse signals by means of a dial switch or keyboard 15 and transmit same to the actuating input 14a of stepping motor 14 wherein the number of pulses generated determines the degree of deflection of the beam emanating from housing 11 and the track with which it is desired to align said beam prior to the recording or reproduction function. A switch 16 is operated to pass the output pulses from device 15 to the stepping motor 14 and a second switch 14S may be manually operated, either prior to or after the recording function, to cause stepping motor 14 to return to a home position.

When it is desired to record a plurality of signals along respective side-by-side tracks of a card C prepositioned on platform 65 before ejecting the card from the device 61, a switch 43 is closed permitting the output of limit switch 44 to be passed to the energizing input 37E of pulse signal generator 37 and a switch 37S is closed gating the output of signal generator 37 to the energizing input 37A of code signal generator 38 so that each time a pulse is generated by signal generator 37 it will be passed both to energize the code generator 38 and, through switch 16, to the input 14A of stepping motor 14. In other words, pulse signal generator 37 may comprise a timer which is operable to generate output pulses at time durations sufficient to permit recordings to be made of each video picture signal generated along one track of a card before the recording of another video picture signal is effected along the next track of the same card. Accordingly, the output of control pulse signal generator 37 is also connected through a multiple-pole, manually operated switch 73 to the servo motor 34 which, each time it is energized, feeds an individual document from the stack or storage supply 36 thereof to the conveyor 35 for positioning same in the scanning field of the television camera 19 or, depending on the operation of switch 73, energizes the input 67A extending to the video signal generator 67. Video signal generator 67 may comprise a full-frame video picture signal recorder and reproducer unit operable, each time its input 67A is energized, to generate a different selected video picture signal which is passed on the output 67B thereof to the signal separator 39. Code generator 38 is also connected to an input 38A of signal separator 39 so that the code signals generated thereby are passed to the output 39A extending to light modulator 17 for generating a series code in the form of light pulses prior to modulating the beam B with the video information, thereby recording a pulse code at the start of the video picture signal recording along the selected track of the card.

In the mode of operation of the apparatus 10 involving the recording of a single, full-frame video picture signal along a selected track of a card, a switch 68 disposed between the output of limit switch 44 and the forward drive control 52 of card driving motor 50, is closed so that the pulse generated by limit switch 44 when the leading edge of the card is detected thereby, after passing through a suitable time delay element 49B, is applied to start motor 50 when recording has been effected along the selected track, thereby driving the card off platform 65. When switch 68 is opened, as in the multiple-track recording mode, the actuation of limit switch 44 by the card, will not result in the starting of motor 50 until a signal is received on the start control 52 from the control pulse signal generator 37 which latter-mentioned pulse is generated by generator 37 after a desired number of pulses has been generated thereby representing the number of tracks of the card onto which recordings are to be effected. Accordingly, pulse signal generator 37 contains two outputs, one 37A extending to the code generator 38 and to switch 73 for controlling picture signal generation and the other 37B extending to the start control 52 of motor 50.

All signals generated on the start control 52 of motor 50 also pass directly to the retract control 48 of solenoid 46 so that the holding action on the card is released just as or prior to the operation of motor 50 which drives the card off platform 65.

Notation 41 refers to a digital computer which is preferably applicable to effect the selective reproduction of signals from selected cards although it may also be utilized to control the recording operation. The computer 41 accordingly has outputs connected to line 37A for intermittently energizing the code generator 38 and to the beam deflection servos 14 and 27 to control the deflection of the beam to a selected track or tracks of the card and the scanning movement thereof along the selected track or tracks during the recording operation.

Notations 68 and 70 refer to manual switches which are opened to respectively prevent starting of motor 50 and operation of solenoid 46 when it is desired to scan a plurality of tracks of the card positioned on platform 65 under the control of signal generator 37. Notations 69 and 73 refer to multiplepole manual switches employed to respectively control either the signal generator 67 or camera 19 or the card feeding servo 34 during automatic scanning operations.

Beam Reading Operation

Assuming that a plurality of record cards are available and manually or automatically derivable from a storage system wherein each of the cards contains a plurality of full-frame video picture signals of the type described or other forms of information recorded along each of the parallel tracks TA-TN of the cards as described, with each track information signal recording being preceded by a series code identifying the information recorded on the track, in order to generate and present the information of a selected track of a selected card in monitorable form, the card is either manually or automatically fed to the receiving platform 64 whereby the leading edge thereof activates limit switch 45 which pulses the start control 52 of motor 50 driving the card along platform 65 until limit switch 44 senses and is activated by the leading edge of the card and generates a control pulse on its output which is transmitted to the stop control 53 of motor 50 and the advance control 47 of solenoid 46. Activation of these controls respectively stops motor 50 with the card predeterminately located on platform 65 and effects the advancing of the solenoid actuator 46S to engage and hold the card in position on platform 65.

Prior to predeterminately locating the card on platform 65, the operator determines from which track of the selected card he wishes to effect signal reproduction monitoring, a function which may be effected by reference to a list defining the information recorded on the card in terms of the track number or number of tracks the desired recording track is located with respect to an endmost track of the card. The operator selectively operates the track-to-track stepping motor 14 by operating rotary selection switch 15 to cause the motor to step pivot housing 11 until the beam scanning axis thereof intersects the selected track of the card. When housing 11 is so pivotally positioned, the card is fed to platform 64 and then driven to its predetermined position on platform 65. Since limit switch 44 is connected to energize the input control 27C of the servo 27 which causes the beam to scan longitudinally along the card, the read-beam, energized by power supply PS, effects such scanning along the selected track and the light thereof which is modulated by the recordings along the selected track is detected by photoelectric detector 28 which generates the composite video picture signal representative of the recording along the selected track on an input to the television receiver or monitor 29. If monitor 29 includes a television signal storage tube, the tube will be operable to generate a still image on the display screen 29D thereof which will be retained until the operator effects erasure of said still image by means of a conventional control switch.

In the reproduction mode, the output of photoelectric detector 28 may also extend to a television signal recorder such as a video tape recorder 30 for recording full-frame video picture signals from a plurality of selected tracks of a card for selective monitoring or processing.

The system 10 is also operable to effect the recording of selected information onto selected tracks of selected record cards under the control of digital computer 41 having a plurality of outputs 42 which extend to the input of code generator 38, the stepping input 14A and return-to-home input 14B of the lateral beam positioning monitor 14 and a switch 73 for passing computer generated control signals to the trigger input 19B of camera 19 or the control 67C fo video signal generator 67 and the control input 34C to the servo 34 used to feed individual cards to the scanning field of the camera 19. The computer 41 may thus be used to control all of the described functions and devices to effect automatic signal recording and/or reproduction.

In FIG. 3 is shown a modified form of the invention comprising a system involving both the recording of information such as full-frame video signals along selected tracks of a record card of the type hereinbefore described and the reproduction of selected video signals from a card while the card is in motion. In other words, unlike the system 10 of FIG. 2, the system 10A of FIG. 3 provides for laser or other suitable means for generating a recording radiation beam which is intensity modulated while stationary to provide a video recording or other form of information recording along the track of the card with which the beam is aligned at the start of recording. The system 10A of FIG. 3 also provides for generating a reading radiation beam which remains stationary during the reading operation as the card is driven. Both recording and reading beams, however, are first deflected laterally with respect to the card to bring them into alignment with a selected track of the card. Recording is effected by localized variations in the beam intensity or by pulsing the beam as the recording material is driven therepast to define variations in the erosion and surface topography of the record track or variations in exposure of photosensitive material coating or comprising the recording surface of the card.

The system 10A includes components which are similar in operation to similarly numbered components provided in the system of FIG. 2 such as a television camera 19, document feeding and conveying means 36, video monitor 29, manual signal generator 15 for controlling deflection of the housing 11A containing the laser or controlling the deflection of an optical component such as a mirror, prism or other device receiving the laser beam to bring it into alignment with selected tracks of a card, modified control signal generator 37G for generating control signals for effecting recordings on and reproduction from adjacent progressive record tracks, digital computer 41 for automatically controlling recording on and reproduction from any array of record tracks of a card or cards of the type described, a code generator 38 and a limit switch 45A for detecting the leading edge of a card for initiating the recording function.

The card driving and positioning unit 80 of FIG. 3 contains side walls or guides 81 and 82 for cards fed to a receiving platform 83 from a stack or input conveyor (not shown) to a central platform 84 and, assuming that recording or reproduction is desired only with respect to a single track of a card, to an exit platform or storage chute 85.

The card feeding and prepositioning device 80 includes a plurality of drive wheel assemblies composed of drive wheels, six of which are shown and are denoted 86A–86F supported respectively by shafts 87A, 87B and 87C. All of the wheel and shaft assemblies are driven by a single reversible gear motor 88 having forward, stop and reverse controls denoted 88F, 88S and 88R which may be pulse operated to drive the card forward along device 80 and either completely off the platform 84 upon completion of a recording or reading operation relative to a selected track of a card or to effect one or more repeat cycles of the recording or reproduction operation by stopping the forward movement of the card and then reversing its direction back across platform 84 to a position whereby the leading edge of the card is beyond the longitudinal position of the axis of the scanning beam so that movement of the card in the forward direction thereafter will cause the card to be scanned by the beam along substantially the entire length thereof defining the longitudinal record tracks of the card.

A typical recording operation relative to a single track of a card fed to platform 84 involves first feeding the card to receiving platform 83 so as to align the card in the lateral direction on said platform, detecting the leading edge of the card by activating limit switch 45A which generates a pulse on its output which is applied to the start control 88F of motor 88 power operating the card driving wheels. The pulse output of limit switch 45A is also passed through a time delay element 49G and then through manual switch 69 to the energizing input of an automatic frame deflection control signal generator 20 of a television camera 19 causing the read-beam of the camera to full-frame scan the image of a document D disposed in a scanning field and to generate the full-frame video picture signal on the output of the camera. After passing through the video modulator 18 the video signal is then fed to signal separator 39 and the intensity component thereof is separated and fed to the light modulator 17 of the laser beam control apparatus provided in housing 11A while the deflection or focus control component of the signal is fed to the deflection system 22A which receives and laterally deflects or varies the focus of the beam in the vicinity of the selected record track. Prior to or just as the card is being fed to the platform 84, servo 14 is predeterminately operated, as described, to predeterminately vary the angle of the housing 11A or an optical component therein so as to laterally deflect the laser beam B to intersect a selected track of the card as it is fed along the central platform 84. Recording is, of course, effected by connecting the power supply 33 through switch 32 to the input of the laser 12 and modulating the laser beam preferably as the leading end of the selected record track approaches or becomes aligned with the beam scanning axis. This may be effected by providing the switch 32 of a type which will normally remain open prior to a recording operation and will be closed upon receipt of a signal generated at a predetermined time after limit switch 45A becomes activated upon detecting the leading edge of a card. In other words, the output of 45A is shown passing through a time delay relay 49H, the output of which extends to a switching input of switch 32 which, when energized by a signal generated by time delay 49H, maintains power from recording power supply 33 at the input to laser 12 for a time interval sufficient to energize the laser while its beam scans that length of the card containing the record tracks T therealong.

During reproduction of information from a selected track of the card, the switch 32 is operated connecting the reading power supply 34 to the input of laser 12 and the reading beam is caused to intersect the selected track of the card. The light energy of the beam reflected off the selected track of the card is passed to photodetector 28 and then to the input of monitor receiver 29 to provide an image on a viewing screen 29D thereof.

In recording or reproduction functions relative to a number of adjacent tracks of a card, pulse control signals are generated on an output of the control pulse generator 37G at time intervals sufficient to permit a card to be driven completely past the scanning axis of the beam B emanating from housing 11A and to thereafter be driven back to a location where the leading edge of the card or the record tracks thereof clears the scanning axis of the laser beam so that the recording or reproduction function may be repeated with respect to the next track of the card. To effect automatic control of the motor 88 in driving the card, as described, to position it to the left of the scanning axis of the beam so that it may again be driven past the beam, a multi-circuit cycle controller 90 is employed having a plurality of outputs denoted 91A, 91B, 91F, 91S and 91R. Outputs 91F, 91S and 91R extend respectively to the forward drive control 88F, stop control 88S and reverse drive control 88R of motor 88 while outputs 91A and 91B extend respectively to the document feed servo 34 and the input to switch 69 so as to effect pulsing the full-frame control 20 of the camera 19 to generate video signals of the documents intermittently fed to the scanning field of the camera by servo motor 34. The energizing input to multi-circuit controller 90 extends from the control signal generator 37G which, as described, in its simplest form, comprises a timer operable to generate pulse signals on its outputs each of which signals is separated in time from the previously generated signal an interval sufficient to permit the multi-circuit controller 90 to complete its cycle and to thereby permit the card to be driven to complete transducing relative to one record track and reversed to clear the scanning axis of the beam so that the next cycle controlled by multi-circuit controller 90 may be initiated thereafter and completed to properly drive the card during the next transducing function. An output of signal generator 37G also extends through switch 16 to the input of stepping servo 14 so that each time said servo is pulsed thereby, it pivots laser housing 11A a degree to cause the scanning axis of the radiation beam to step to the next track of a card after which recording or reproduction is effected relative to said next track as described.

In the apparatus illustrated in FIG. 3, suitable time delay elements denoted 49F, 49G, 49H, etc., are provided, where needed, to delay the control signals generated for sufficient time intervals to permit recording to be properly effected.

As in FIG. 2, code signal generator 38 is connected to receive pulse signals during a recording operation from control signal generator 37 and limit switch 45A. Limit switch 45A provides an initiating pulse for causing signal generator 38 to generate a series code on its output when the leading end of the selected track of the record card comes into alignment with the scanning axis of the laser beam. Control pulse signal generator 37G has an output which is connected through a switch 37S which is closed when code recording is desired, so that a control signal generated on the line extending through switch 37S will be passed to the energizing input of the code generator 38 causing it to generate a series code which is passed to the light modulator 17 causing the beam to be gated on and off in the form of the desired code so that the code will be recorded along the selected track of the card.

Whereas in FIGS. 2 and 3 recording and reproduction beam movement is effected in one or two directions while the record card C is held stationary to effect the scanning of the selected track of the card and/or the attainment of alignment of the beam with the selected track, it has been noted that the beam may be substantially fixed in space while the card is laterally shifted to bring the selected track thereof into alignment with the beam scanning axis and then longitudinally moved to cause the stationery beam to scan the selected track. Such card lateral movement may be controlled by scanning the track indicating marks TT shown in FIG. 1 and being printed or otherwise provided at the leading edge CL of the card, generating pulses as the marks are scanned and utilizing such pulses as feedback signals to effect control of the motor or motors employed to effect lateral movement of the card across the card handling device with which the laser is aligned to effect recording and/or reproduction operations. In FIG. 4 a control system 10C is provided in which the output of the photoelectric detector 28 is sensed by a sensing circuit or coded relay 91 which generates a pulse on its output each time the read beam of the laser scans a track indicating line TT of a card. The pulses so generated are fed to an uncounting input of a presettable predtermining counter 92. The counter 92 is preset to uncount upon receipt of a predetermined number of pulses on its input 92B by generating and feeding the desired number of count pulses on the output of computer 41 or by means of manually operated stepping switch pulse generator 93 and applying such pulses to the presetting input 92A of the counter 92 porior to the uncounting operation thereof. A manual switch 94 connects either the output of the computer 41 of manual pulse signal generator 93 to the input 92A of counter. Upon uncounting, the counter 92 generates a control pulse on its output 92C which is applied to the stop control 95S of the motor 95 employed to drive the card laterally across the platform of the card recording-reading device stopping lateral movement of the card with the leading end of the selected track thereof aligned with the axis of the read-write beam of the laser system 11B. The output 92C is also connected to the start control 96F of a motor 96 employed to drive the card in the longitudinal direction through the scanning field of the beam B wherein said beam is caused to scan the selected track area defined by the position at which the card is stopped in its lateral movement when the uncount signal is generated by the counter 92. The output of the card leading edge sensing limit switch 44A which detects when the card inserted into the reader-recorder is at a predetermined longitudinal position therein such that the track indicating lines or marks TT may be scanned by lateral movement of the card, is also passed to a bistable switch 90 in the output of photoelectric detector 28 and to the start control 95F of motor 95 as well as the stop control 96S for the motor 96 employed to drive the card longitudinally past the beam. The signal generated by switch 44A closes switch 90 permitting the pulses generated by the photoelectric detector in scanning track marks TT to be passed to the relay 91 for energizing the input 92B of the counter 92 each time a track mark or line is scanned and detected a function which is effected as the motor 95 drives the card laterally.

The output 92C of counter 92 is also connected to the energizing input 37E of a control signal generator 37D which is programmed to generate a plurality of control signals on outputs 37F thereof for controlling such functions as described and including energization of a code generator such as generator 38 of FIGS. 2 and 3 and the operation of auxilliary servos such as those described for ejecting or rerunning the card through the scanning zone to scan the next track, feeding the next card to the reader-recorder unit, energizing the television camera or flying spot scanner, etc.

It is noted that the apparatus employed in the system of FIG. 4 may comprise either retractable wheel means engagable with the card on the platform for laterally and longitudinally driving a card on the described prepositioning platform or means for driving a platform to which the card is held on a base, first to laterally position the card with the selected track thereof in line with the scanning axis of the read-write beam and then, after lateral movement is stopped as controlled by the signal generated unpon uncounting the counter 92, to carry the card thereon in a longitudinal direction so as to carry the selected track thereof properly past the scanning beam intersecting same.

In FIG. 5 is shown a modified arrangement of the apparatus of FIG. 4 wherein lateral deflection of the read-write beam B of FIG. 2 or 3 is effected by employing a motor or stepping servo 97 to pivotally drive the laser housing or a mirror receiving the laser beam to align the beam with a selected track of a card which is prepositioned on a platform opposite the laser as described. The beam or housing deflection servo 97 is controlled in its operation to cause the scanning axis of the beam to be shifted from a home location along the first track of the card to a selected track thereof in response to a signal generated by the card sensor 44A until said servo 97 receives the control signal generated on the output 92C of the described counter 92. The output pulse generated by the counter 92 is applied to the stop control 97S of the servo 97 controllably stopping same with the scanning axis of the beam disposed thereby in alignment with the selected track of the card. Thereafter the card or card platform is driven in a longitudinal direction as the beam modulation means is energized to effect recording of the desired information along the selected card track or, in the reproduction mode, the read beam is generated to provide radiation derived in scanning the selected track for the described photoelectric detector.

A series of binary bit codes may be recorded laterally across the card either in series or parallel in the lateral direction such as the area occupied by the track identifying marks or lines TT, wherein each code identifies each track of the card. In such a coding arrangement, the read beam of the laser or an auxilliary beam generating means may be employed to read the binary codes as the card ot beam is moved laterally as described. FIG. 6 illustrates a system for using such binary codes to control track selection. The output of detector 28 is passed through switch 90 to a series-to-parallel converter 98 which converts the series code to parallel on its outputs which extend to parallel inputs 99A of a code matching relay 99. To select a card track for recording on or reproducing from, an operator operates key switches of a keyboard 100 to generate the code representative of the selected card track which code is applied to the matching inputs 99B of the relay 99 and held thereon until a match occurs with the codes generated on inputs 99A whereupon a control signal is generated on an output 99C and applied, as described above, to the stop control 95S of servo 95 and the start control 96F of servo 96 for respectively stopping the card with the selected track thereof aligned with the scanning axis of the beam and initiating movement of the card in a longitudinal direction to cause the beam to scan the selected track. As stated, the servo motors 95 and 96 may be respectively operated to drive the card laterally across the platform on which it is supported, or to drive a platform on which the card is supported, first laterally and then longitudinally to effect scanning the selected track of the card or to first deflection control the beam to scan laterally to the selected card track, then control said beam to scan longitudinally along the selected track of the stationery card.

Whereas it has been proposed to employ an intense laser or electron gun beam to burn, etch or otherwise erode or discolor the surface stratum of a card or a coating thereon to define a series of small holes, a variable width fine channel or a variable width burned line representing the information recorded, other means may be employed to effect electro-optically readable recordings along the tracks of the cards described. For example, the recording device employed in housings 11,11A,11B etc. may comprise means for continuously generating or intermitting pulsing a fine stream of air or air molecules which have been heated or ionized to a high temperature such that the stream thereof intersecting the surface of a record card, such as a paper or plastic surfaced card, will burn or variably erode same to provide analog or digital recordings therein. Hot, ionized molecules of air, for example, may be used to burn and discolor paper or card fibers to form a series of space separated spots during recording scanning the spacing and number of shich are representative of the information being recorded. By electrostatically or electro-magnetically varying the width of the airstream so heated as it is directed against the surface of the record track being scanned in accordance, for example, with analog or video information generated as described, fine lines of variable width may be burned or eroded in the surface of the record card along the track being scanned which may be photo-optically scanned, as described, to read same and generate the same information as electrical signals when reproduction of such information is desired. Similarly, such techniques of variably pulsing a stream of air or varying the width of such a stream which is heated just prior to or after such pulsing or width variation, may be employed to record by variably exposing photographic film or the like to heat or variably demagnitizing a uniformly magnetized magnetic recording surface of a magnetic card along the selected record track thereof.

I claim:

1. A system for recording video information on a record card comprising:
    first means operable to generate video picture signals, each of which video picture signals defines at least one full frame of video information,
    first control means for controlling said first means to generate frame video picture signals, and
    second means including radiation beam generating means operable for generating a narrow beam of recording radiation of sufficient intensity to vary the topography of recording material intersected by said beam and means for receiving a frame video picture signal from said first means and modulating said narrow beam in accordance with said video picture signal received to permit the beam to selectively vary the topography of the recording material of a record member,
    third means in operative location with respect to said second means for prepositioning a record card containing a plurality of parallel narrow record tracks with respect to said second means so as to permit said second means to record video signal information along selected record tracks of said card,
    fourth means for effecting lateral relative positioning of a record card and said second means to dispose the scanning axis of said narrow beam of recording radiation in alignment with a selected narrow record track of said card,
    fifth means for effecting relative movement between said card and said narrow beam of recording radiation so as to cause said narrow beam to scan said selected track, and
    sixth means for activating said first control means to cause said first means to generate an output signal representative of the information contained in the field scanned when said fourth means is operated to effect the relative positioning of said scanning axis of said narrow beam of recording radiation with respect to a selected card track wherein the signal generated is employed to modulate said recording beam as it scans said selected track and said recording beam records the information defined by said signal along an area of the selected track of the card scanned by said beam.

2. A system in accordance with claim 1 wherein said first means includes a television camera and means for controlling said camera to effect a full-frame scan of the image field of the camera and to generate a full-frame video picture signal defining said full frame of video information for application to said second means.

3. A system in accordance with claim 1 wherein said second means is operable to generate a beam of recording radiation of sufficient intensity to variably erode material from selected record tracks of said card.

4. A system in accordance with claim 1 wherein said second means is operable to generate pulsed radiation for forming information defining cavities in the recording area of a record card intersected by said beam.

5. A system in accordance with claim 1 wherein said sixth means includes means for detecting a lateral edge of a record card fed to said third means and generating a control signal when such lateral edge is detected and means for applying said control signal to activate said first control means to cause said first means to generate said video picture signals.

6. A system in accordance with claim 5 wherein said first means includes an electronic memory having a read-out control means connected to receive said first control means output signal activated by said sixth means to cause information recorded in said memory to be generated as electrical signals and to be applied to said second means for variably controlling the operation of said radiation beam generating means to effect control of said beam to record such information along a selected track of the card.

7. A system in accordance with claim 1 wherein said first means includes a memory containing recorded therein a full frame of video information in the form of digital signals for application to said second means to vary the topography of a recording material by intermittently intersecting and eroding cavities in said recording material.

* * * * *